(12) United States Patent
Bryant

(10) Patent No.: US 11,628,636 B2
(45) Date of Patent: Apr. 18, 2023

(54) AUTOMATED TOW/TAPE PLACEMENT SYSTEM

(71) Applicant: UNITED STATES OF AMERICA AS REPRESENTED BY THE ADMINISTRATOR OF NASA, Washington, DC (US)

(72) Inventor: Robert G. Bryant, Lightfoot, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 17/369,109

(22) Filed: Jul. 7, 2021

(65) Prior Publication Data

US 2023/0009761 A1    Jan. 12, 2023

(51) Int. Cl.
*B29C 70/38* (2006.01)
*B29C 70/54* (2006.01)

(52) U.S. Cl.
CPC .......... *B29C 70/388* (2013.01); *B29C 70/545* (2013.01); *B29C 2793/0027* (2013.01)

(58) Field of Classification Search
CPC ..... B29C 70/38; B29C 70/382; B29C 70/384; B29C 70/386; B29C 70/388; B29C 70/545; B29C 2793/0027
See application file for complete search history.

(56) References Cited

U.S. PATENT DOCUMENTS

| | | | |
|---|---|---|---|
| 3,775,219 A | 11/1973 | Karlson et al. | |
| 5,954,917 A | 9/1999 | Jackson et al. | |
| 7,039,485 B2 | 5/2006 | Engelbart et al. | |
| 7,591,894 B2 | 9/2009 | Becker et al. | |
| 7,717,151 B2 | 5/2010 | Wampler et al. | |
| 2006/0118244 A1 | 6/2006 | Ballos et al. | |
| 2011/0005456 A1* | 1/2011 | Lizarralde Dorronsoro | B29C 70/545 83/78 |
| 2014/0028831 A1* | 1/2014 | Cayment | B29C 70/388 348/88 |
| 2017/0001343 A1* | 1/2017 | Tsuruta | B29C 43/22 |
| 2017/0151731 A1* | 6/2017 | Ho Yew Chi | B33Y 50/00 |
| 2018/0257305 A1 | 9/2018 | Nes et al. | |

OTHER PUBLICATIONS

Jeffries, Kyle A. "Enhanced Robotic Automated Fiber Placement with Accurate Robot technology and Modular Fiber Placement Head", SAE Int. J. Aerosp., 2013, 8(2).

Kozaczuk, Konrad, "Automated Fiber Placement Systems Overview," Transactions of the Institute of Aviation, 2016, pp. 52-59, 245, No. 4.

(Continued)

*Primary Examiner* — George R Koch
(74) *Attorney, Agent, or Firm* — M. Bruce Harper; Robin W. Edwards; Trenton J. Roche

(57) ABSTRACT

Systems, methods, and devices of the various embodiments may provide Automated Tape (or Tow) Placement (ATP) systems including machine-based parts that support prepreg tape laying processes to build composite parts. Various embodiments may be applied to materials that may be consolidated during fabrication and/or may be used to fabricate parts that may require post processing steps.

14 Claims, 15 Drawing Sheets

(56) References Cited

OTHER PUBLICATIONS

Denkena, Berend et al. "Automated Fiber Placement head for Manufacturing of innovative Aerospace Stiffening Structures", Procedia Manufacturing 6, Elsevier, 16th Machining innovations Conference for Aerospace Indusctry—MIC 2016, 2016, pp. 96-104.

Qureshi, Z. et al. "In Situ consolidation of thermoplastic prepreg tape using automated tape placement technology Potential and possibilities", Composites: Part B 66, 2014, pp. 255-267.

Sloan, Jeff, "General Atomics Aeronautical developing tool-less thermoplastics composites process", Composites World, Jan. 7, 2019 published at https://www.compositesworld.com/news/general-atomics-aeronautical-developing-tool-less-thermoplastics-composites-process. Access Jun. 2, 2021.

Jacob, Amanda, "Highlights: Composites Convention 2019", Composites World, Jul. 7, 2019 published at https://www.compositesworld.com/articles/highlights-composites-convention-2019, Jun. 12-13, 2019, 7 pages, Access Jun. 2, 2021.

\* cited by examiner

AUTOMATED TOW/TAPE PLACEMENT SYSTEM

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Automated Tape (or Tow) Placement (ATP) has seen adoption in industry sectors, such as aerospace, transportation, energy, etc., that use composite structures and parts. ATP manufacturing is a method of constructing composite structures by using robotic automation to place strips of prepreg (e.g., carbon fiber prepreg, etc.), commonly referred to as tows or tapes, onto a tooling surface. One or more tows are often spool fed into an applicator head (also referred to as a depositing head) of an ATP system. When more than one tow is used, the tows are lined up in a row side-by-side to be placed onto the tooling surface. A single tow being deposited or an arrangement of side-by-side tows is often called a course, and a course is placed on the tooling surface one course at a time. Multiple courses placed side-by-side make up a ply, and plies are deposited on top of each other to make the part.

Current ATP systems often include a tape laying applicator head system that lays prepreg tape or tow by translating on a robot arm or gantry above a tooling surface. The standard applicator heads have several common parts including: 1) a heating system that develops prepreg tack (e.g., stickiness) and drape (e.g., pliability) just prior to bonding (e.g., adhering) to the substrate layer; 2) a compaction drive wheel that applies a predetermined amount of pressure to the tape to assist bonding; 3) a system to cut and feed tape through the applicator head; and 4) a positioning system to translate and position the applicator head to directionally lay the tape to build the composite part. These standard systems often involve obtuse angle head rotation in scenarios in which plies are to be adjacently placed in a bidirectional manner needed to increase the width of the part beyond the width of the tape. Obtuse angle head rotation can be important for production speed, otherwise without obtuse angle head rotation, the applicator head must translate across the build to a new starting point, without placing any tape, consuming time with each placed layer. Whether using obtuse angle head rotation or translation across the build, both methods reduce placement accuracy due to inherent additive error effects of mechanical motion, or require additional position checks to mitigate the additive effects of location error.

Additionally, these current ATP systems require a manufactured tool surface to build up the part. The tool surface serves several purposes: 1) as a surface to apply pressure against; 2) to help develop and keep the shape of the part's surface; and 3) to assist in curing the finished part under pressure in an autoclave, oven, or press. Additionally, a tensioning system is required in current ATP systems so that the tape is placed in a controlled manner without uncontrolled feed out. The tensioning system may be located on the applicator head, or aft of the applicator head, as part of the tape spooling arrangement.

Other current ATP systems often include applicator heads that are designed to feed tape from several prepreg reels or spools so that varying widths of tape can be laid down simultaneously. This has the added advantage of laying tape in an angular fashion, minimizing waste at the starting and endpoints, or to produce a flat surface curve with minimal ply wrinkling as the outside edge requires more tape than the inside edge. These current ATP systems are used with thermosetting and thermoplastic tapes. The applicator heads for both these types of current ATP systems differ only in scenarios in which the prepreg tape has release paper that has to be removed during layup, typical of thermosetting prepreg, requiring an additional peel off and wind-up system on the applicator head.

While current ATP systems have seen adoption by industry, current robotic technology is based on different use cases, such as pick-and-place, automated welding, and fastener insert technology for automated assembly, and is not optimized composite layup technology needs. Composite layup technology would generally benefit from robotic systems that provided multi-axis dexterity, robotic arm movement to position the applicator head, and precision location controls. Composite layup technology would uniquely benefit from robotic systems that enable the part under construction to translate instead of the robotic arm moving the applicator head, that support start and stop of layup, that include a division of tasks among at least two robots working in concert, that provide real-time chemical and physical analysis of the part during build, and that enable in-situ repair of the part. Additionally, current ATP systems require tooling of the robots to layup composites which can present problems. Additionally, current ATP systems that include tape laying robotic systems are unidirectional in tape placement. In scenarios in which bidirectionality is required, the complete head system must rotate and traverse, unless a direct overlay is being done, which adds undesired complexity to the part fabrication process. Additionally, in current ATP systems prepreg/tape spools are installed by hand and not in an auto-insert-feed-removal system which would be more beneficial. Additionally, current ATP systems the part doesn't translate during build and therefore the part cannot be built beyond a tool or frame size for the ATP system.

BRIEF SUMMARY OF THE INVENTION

Methods and devices of the various embodiments may provide Automated Tape (or Tow) Placement (ATP) systems including machine-based parts that support prepreg tape laying processes to build composite parts. Various embodiments may be applied to materials that may be consolidated during fabrication and/or may be used to fabricate parts that may require post processing steps.

Various embodiments may include an ATP head, comprising: a layup truck, comprising: two rollers; and a rotating transmission supporting the two rollers, wherein the rotating transmission is configured to tilt such that in a first position of the rotating transmission a first of the two rollers operates as a compaction drive wheel and the second of the two rollers operates as a tensioning guide drive wheel for a tape being deposited by the ATP head and in a second position of the rotating transmission the second of the two rollers operates as the compaction drive wheel and the first of the two rollers operates as the tensioning guide drive wheel for the tape being deposited by the ATP head.

Various embodiments may include an ATP system, comprising: a first ATP head, comprising: a first layup truck, comprising: two rollers; and a rotating transmission supporting the two rollers, wherein the rotating transmission is configured to tilt such that in a first position of the rotating transmission a first of the two rollers operates as a compaction drive wheel and the second of the two rollers operates as a tensioning guide drive wheel for a first tape being deposited by the first ATP head and in a second position of the rotating transmission the second of the two rollers operates as the compaction drive wheel and the first of the two rollers operates as the tensioning guide drive wheel for the first tape being deposited by the first ATP head.

These and other features, advantages, and objects of the present invention will be further understood and appreciated by those skilled in the art by reference to the following specification, claims, and appended drawings.

DETAILED DESCRIPTION OF THE INVENTION

Figure 10:
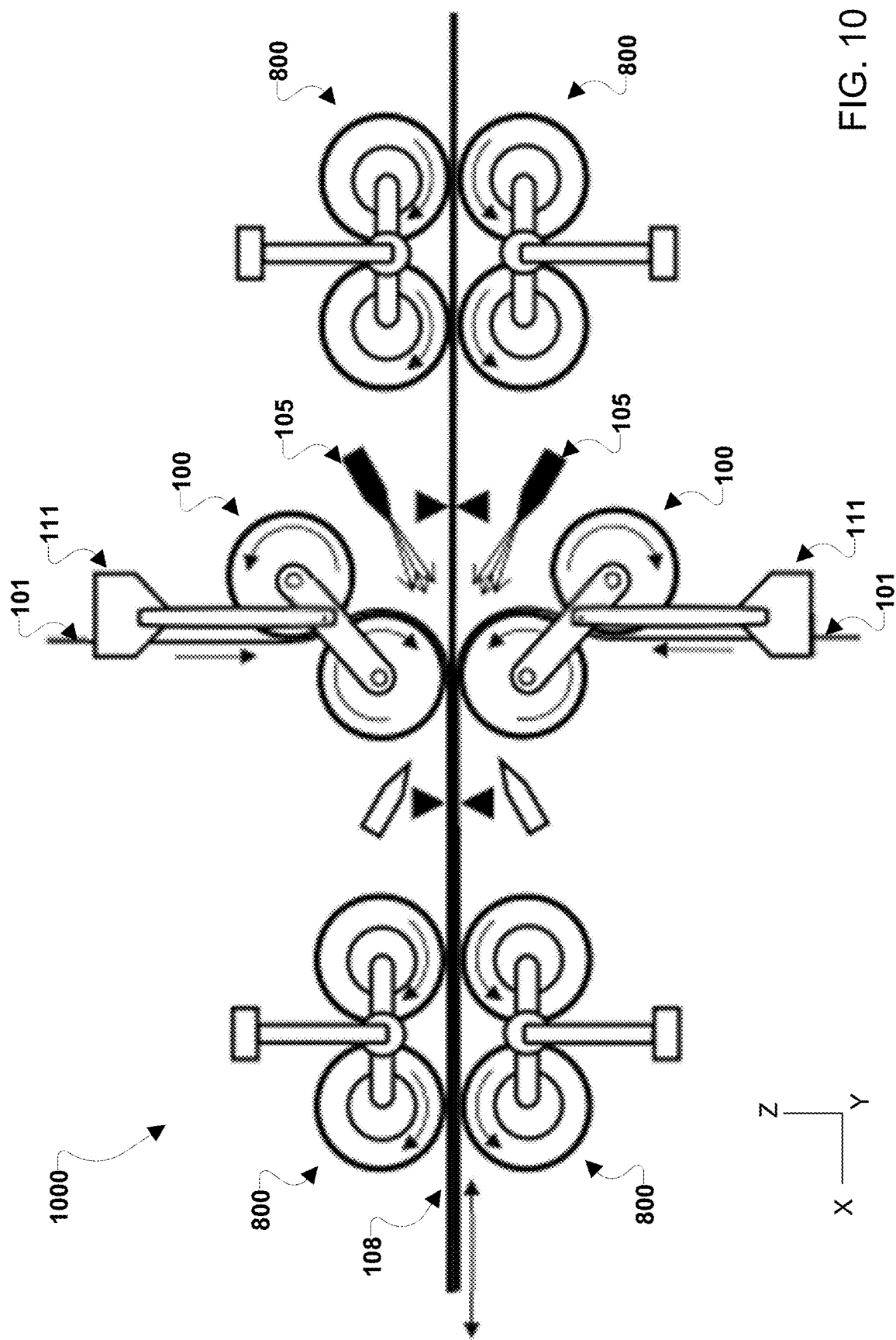
FIG. 10 is a block diagram of components of an example dual ATP head ATP system illustrating tape placement in accordance with various embodiments.

For purposes of description herein, the terms "upper," "up,", "down," "top," "bottom," "lower," "right," "left," "rear," "front," "vertical," "horizontal," and derivatives thereof shall generally relate to the invention as oriented in FIG. 10. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, a computing device as discussed herein may include any electronic device that includes a processor and executes application programs.

While Automated Tape (or Tow) Placement (ATP) has seen adoption in industry sectors, such as aerospace, transportation, energy, etc., that use composite structures and parts, current robotic technology is based on different use cases, such as pick-and-place, automated welding, and fastener insert technology for automated assembly, and does not meet all ATP system needs.

One approach to addressing the shortcomings in current ATP systems has been a dual robot system disclosed by General Atomics Aeronautical Systems, Inc. in U.S. Patent Application Publication No. 2018/0257305. This so called "tool-less" system for fabrication of thermoplastic composites (TPCs) uses two robots that work in concert against each other. One robot dispenses and preheats the thermoplastic prepreg tape, and uses its compaction roller to apply pressure to the roller of the opposing robot. This creates a virtual tool surface and both robots operate in concert using a computer aided design/computer aided manufacturing (CAD/CAM) program. This virtual tool eliminates the need for a solid tool, and the use of thermoplastics mitigates the need for autoclave or hot press post processing, as the composite is consolidated in-situ during the build. Additionally, this also allows for asymmetric building of composite parts (i.e., features can be independently added to each face of the composite panel), and complex out-of-plane curvature that is difficult and costly with a standard solid-faced tool. However, this General Atomics Aeronautical Systems, Inc. system is not in fact entirely tool-less as it requires a starting frame for the initial anchoring of the prepreg to start the structural build. As such, this General Atomics Aeronautical Systems, Inc. system does not meet all composite layup technology needs, for example because it requires a starting frame for the initial anchoring of the prepreg to start the structural build.

Various embodiments provide ATP systems that address the shortcomings of current ATP systems and/or the shortcomings of the General Atomics Aeronautical Systems, Inc. system discussed above, and represent improvements to composite layup technology by mitigating several problems faced in current ATP systems and/or the General Atomics Aeronautical Systems, Inc. system discussed above.

Methods and devices of the various embodiments may provide ATP systems including machine-based parts that support prepreg tape laying processes to build composite parts. Various embodiments may be applied to materials that may be consolidated during fabrication and/or may be used to fabricate parts that may require post processing steps.

Systems, methods, and devices of the various embodiments may avoid obtuse head rotation or cross-tool translation when laying adjunct tape plies, the various embodiments may support using at least two robots to simultaneously place tape on both sides of a part, the various embodiments may eliminate a need of an external anchoring frame, and/or the various embodiments may provide the ability to partially, or fully, translate the part during build in addition to translating the applicator head. Various embodiments may increase layup speed in comparison to current ATP systems by reduction of head rotation reversal during bidirectional tape layup, and simultaneous tape placement on opposite sides. Various embodiments may increase placement accuracy in comparison to current ATP systems through decreased movement between tape layup resulting in decrease tape misalignment, and elimination of an anchoring frame through simultaneous pressure extrusion of prepreg using at least two robots. The use of at least two robots to simultaneously place tape on both sides of a part may eliminate the need for a tool or frame and may remove the boundary of part size by having the part translate during build, rather than the ATP heads. In various embodiments, the method used to translate the part may differ depending on the weight (not mass) of the part, the part's stiffness, the geometry of the part, and a center of gravity of the part during the build.

Various embodiments may provide a layup roller head-based ATP head for an ATP system. In various embodiments, the ATP head may include a layup truck having twin rollers. The layup truck may tilt such that a first of the rollers of the layup truck may operate as a tensioning guide drive wheel for a prepreg tape being deposited by the ATP head in a first direction and the second of the rollers of the layup truck may operate as a compaction drive wheel for the prepreg tape being deposited by the ATP head in the first direction. The ATP head may be bidirectional in that when the ATP head proceeds in a second direction opposite to the first direction the layup truck may tilt such that that the second of the rollers of the layup truck may operate as the tensioning guide drive wheel for the prepreg tape being deposited by the ATP head in the second direction and the first of the rollers of the layup truck may operate as the compaction drive wheel for the prepreg tape being deposited by the ATP head in the second direction. Said another way, the roles of the twin rollers, i.e., as tensioning guide wheel or compaction drive wheel, may switch via the tilt of the layup truck as the ATP head changes direction.

Figure 1A:
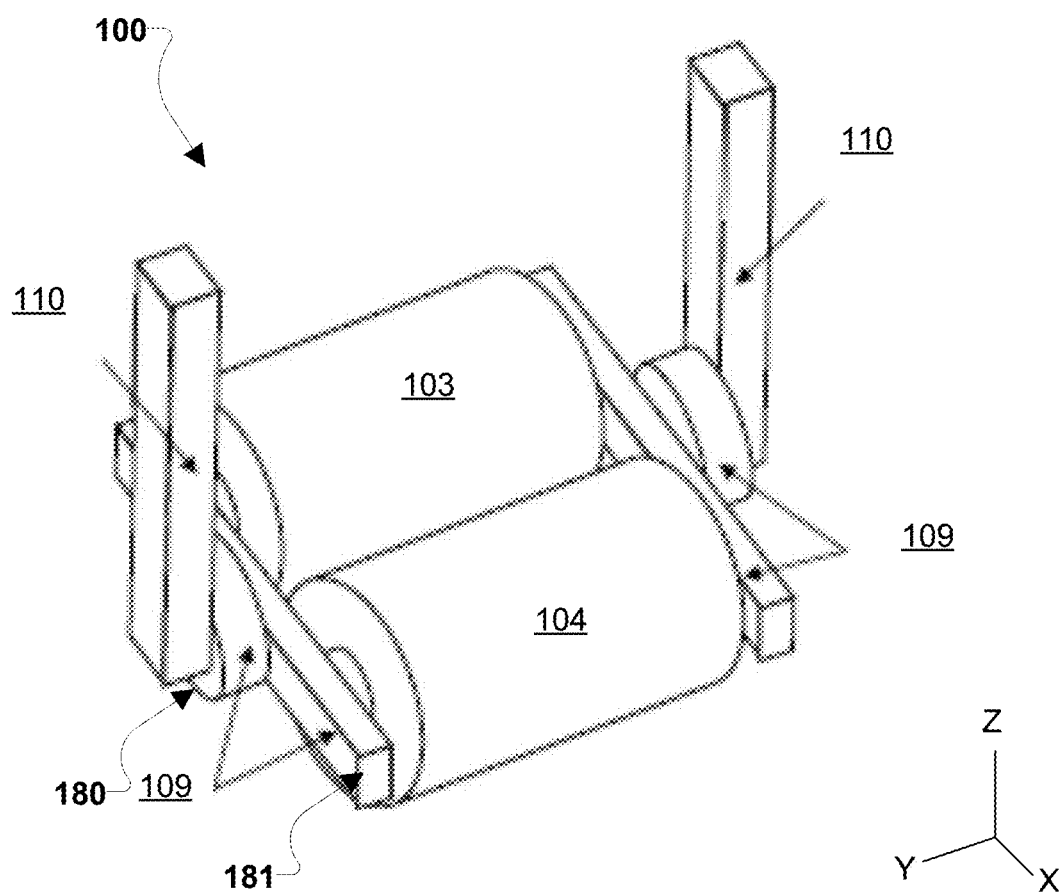
FIG. 1A is a block diagram of an example layup truck including twin rollers in accordance with various embodiments.
Figure 1B:
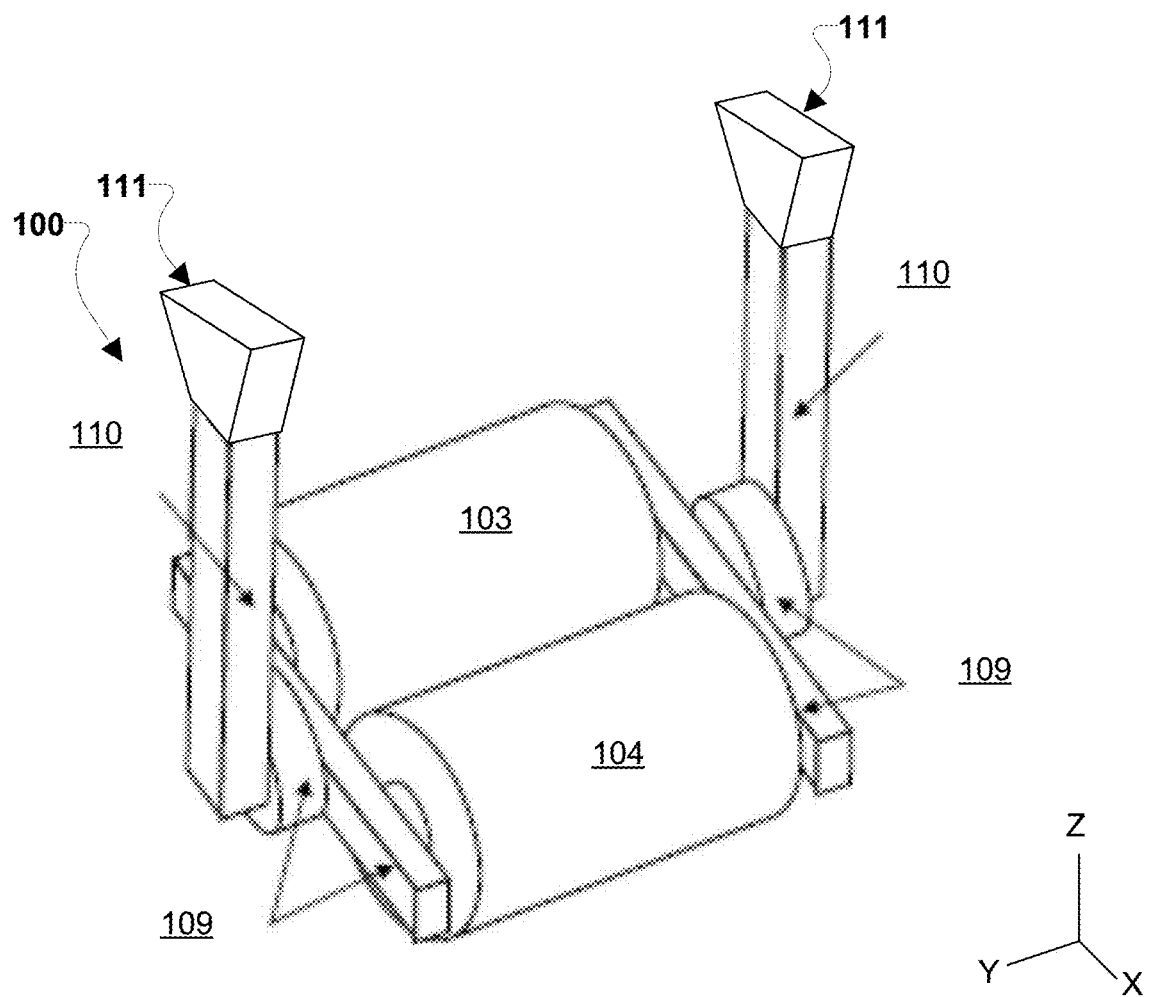
FIG. 1B is a block diagram of the example layup truck of FIG. 1A and an actuator illustrated in accordance with various embodiments.
Figure 2:
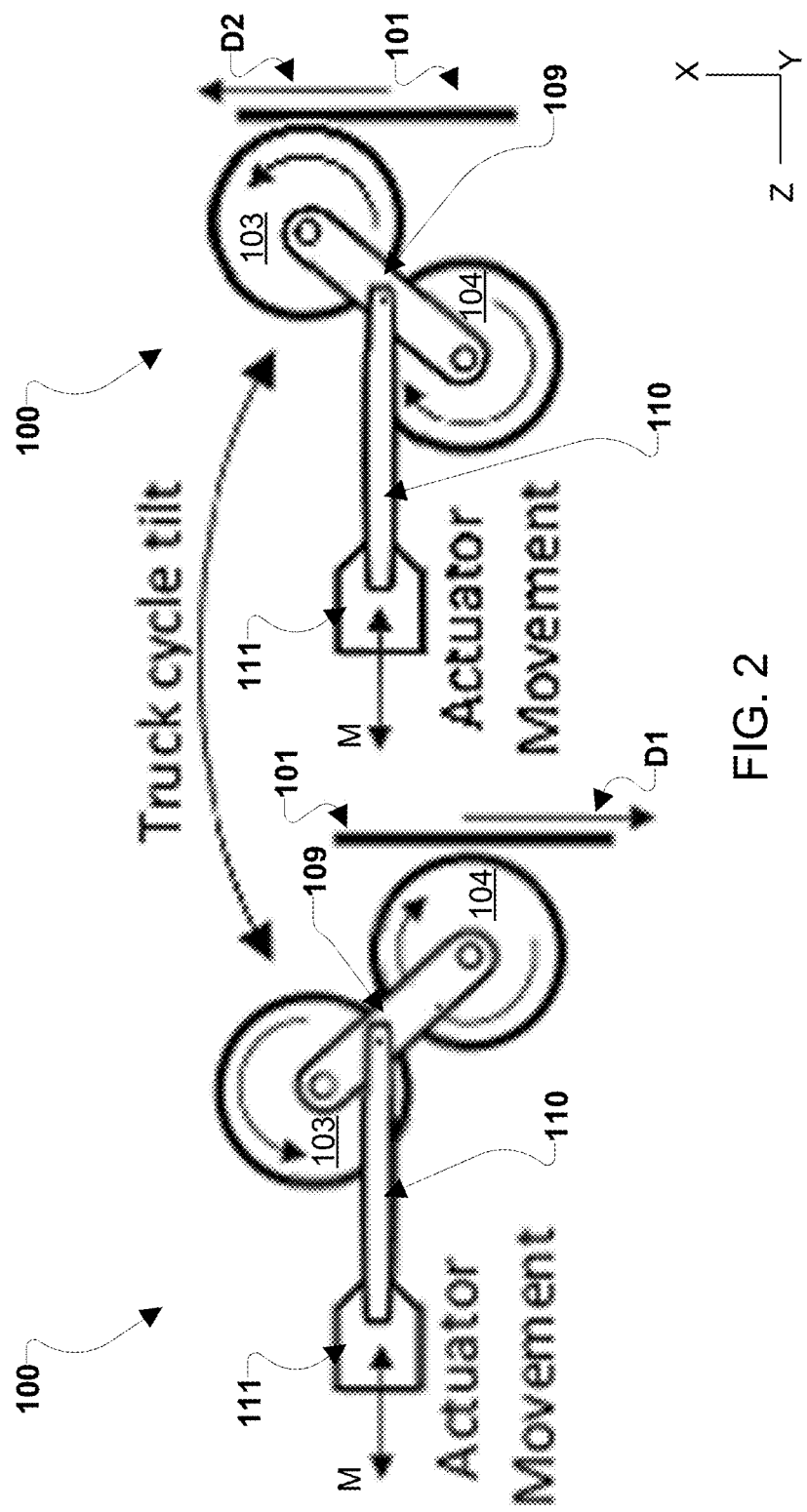
FIG. 2 is a block diagram of an example layup truck illustrating truck cycle tilt in response to a change in direction of an Automated Tape (or Tow) Placement (ATP) head in accordance with various embodiments.
Figure 3:
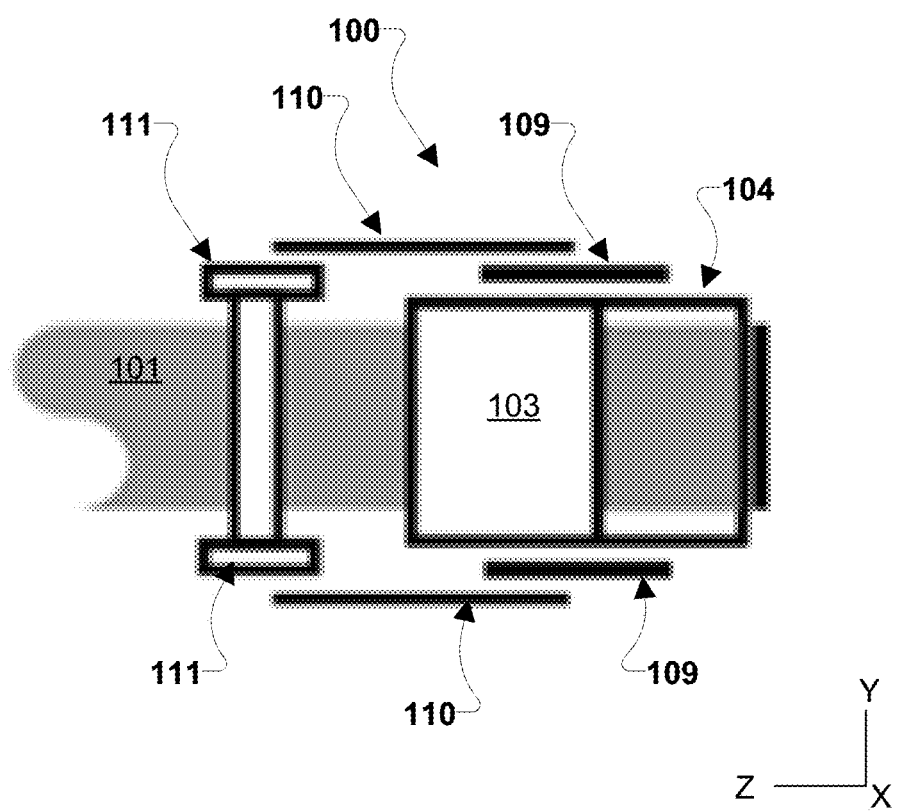
FIG. 3 a block diagram of an example layup truck illustrating how prepreg tape is fed through the layup truck.
Figure 4A:
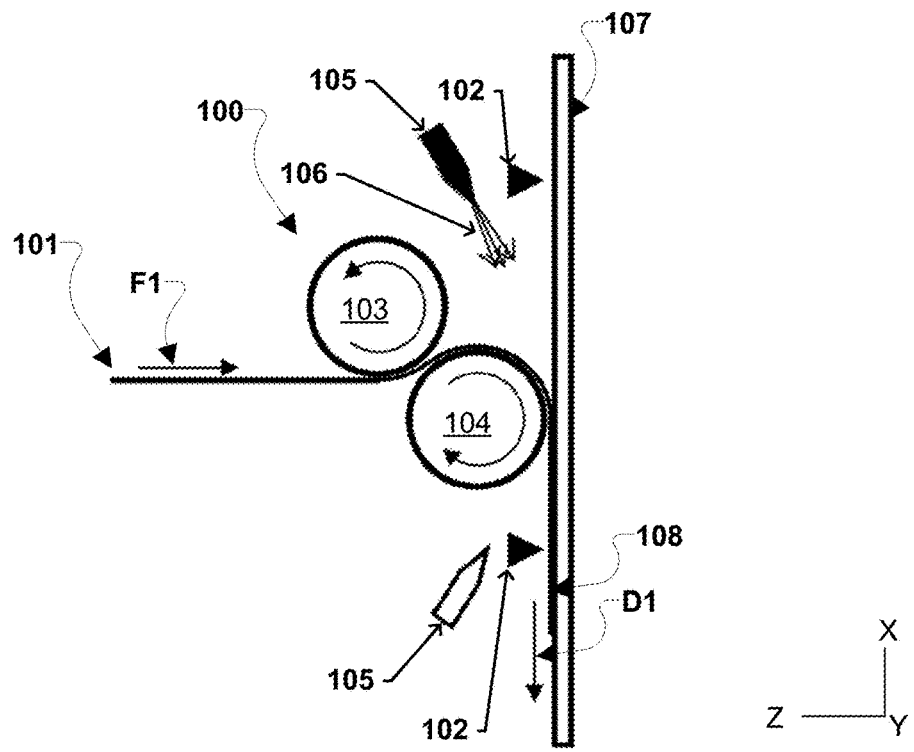
FIG. 4A is a block diagram of an example layup truck and other components of an ATP head illustrating tape placement in a first direction in accordance with various embodiments.
Figure 4B:
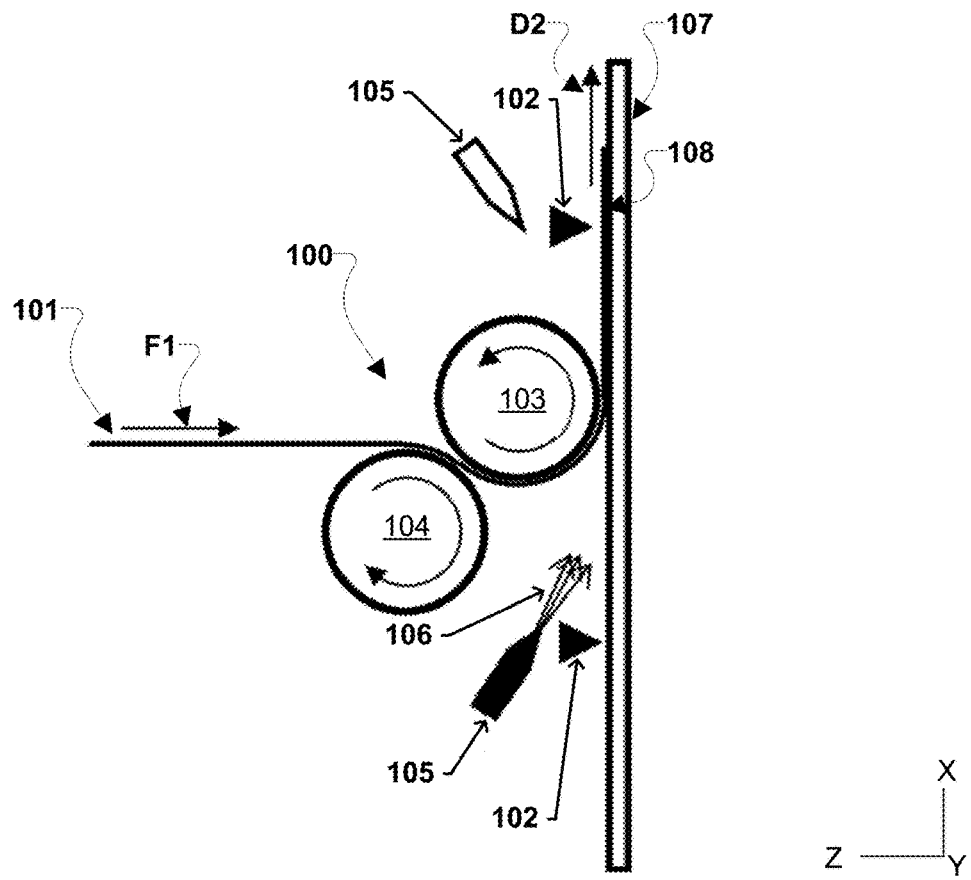
FIG. 4B is a block diagram of the example layup truck and the other components of the ATP head of FIG. 4A illustrating tape placement in a second direction in accordance with various embodiments.
Figure 5:
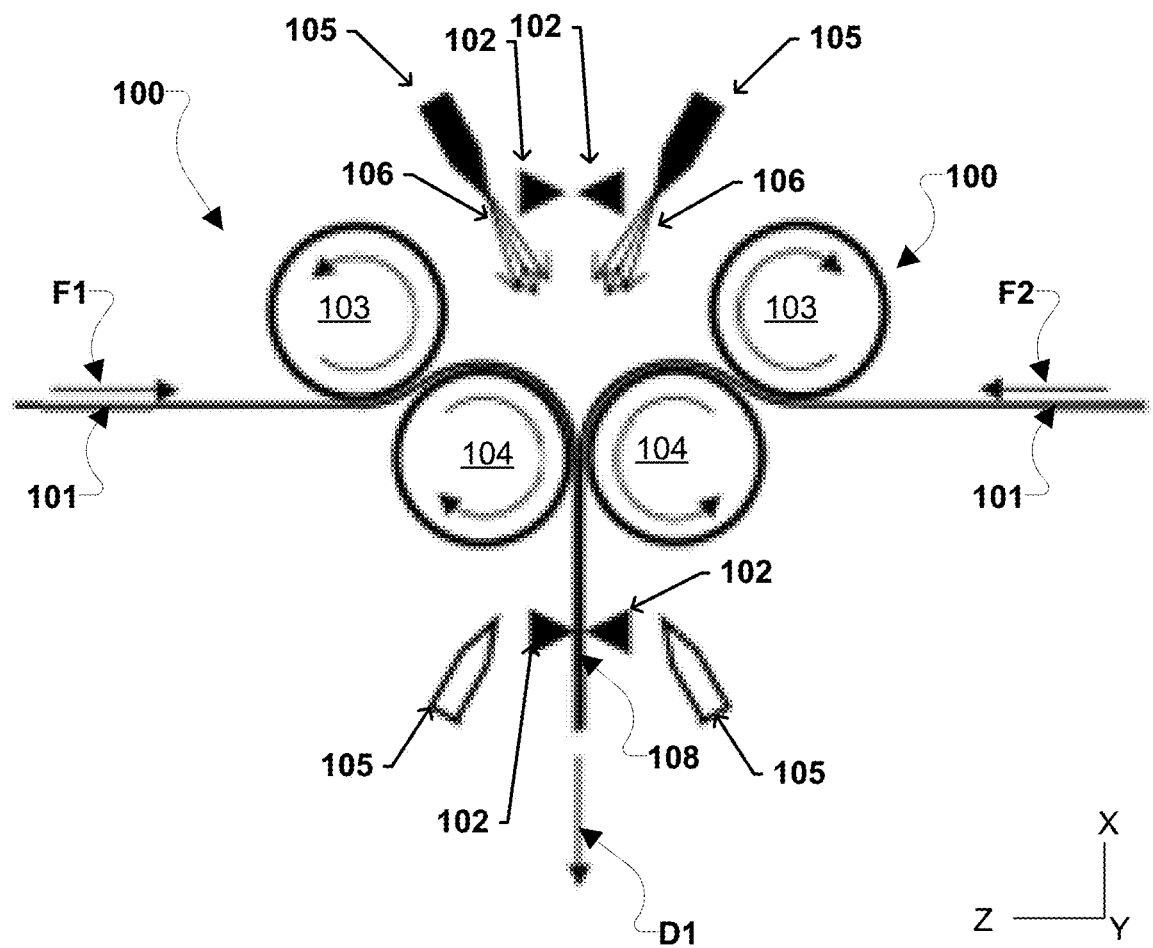
FIG. 5 is a block diagram of two example layup trucks and the other components of a dual ATP head ATP system illustrating tape placement in accordance with various embodiments.

FIGS. 1A-5 illustrate aspects of example layup trucks including twin rollers in accordance with various embodiments. FIG. 1A is a block diagram of a layup truck 100 including twin rollers 103, 104 in accordance with various embodiments. The layup truck 100 may be a component of an ATP head in various embodiments as discussed herein. FIG. 1B is a block diagram of the layup truck 100 and an actuator 111 illustrated in accordance with various embodiments. FIG. 2 is a block diagram of the layup truck 100 illustrating truck cycle tilt in response to a change in direction of an ATP head in accordance with various embodiments. FIG. 3 a block diagram of the layup truck 100 illustrating how prepreg tape 101 is fed through the layup truck 100. FIG. 4A is a block diagram of the layup truck 100 and other components of an ATP head illustrating tape 101 placement in a first direction D1 in accordance with various embodiments. FIG. 4B is a block diagram of the layup truck 100 and the other components of the ATP head illustrating tape 101 placement in a second direction D2, opposite the first direction D1, in accordance with various embodiments. FIG. 5 is a block diagram of two example layup trucks 100 and the other components of a dual ATP head ATP system illustrating tape 101 placement in accordance with various embodiments.

With reference to FIGS. 1A-5, the layup truck 100 may include twin rollers 103, 104 supported relative to one another between two sides of a wheel truck rotating transmission 109. The rollers 103, 104 may be comprised of any suitable material, such as thermoplastics, metals, etc., and may rotate around their central axes (i.e., their Y axes in FIG. 1A) in both clockwise and counterclockwise directions. The wheel truck rotating transmission 109 may take various forms. As one example, opposite sides of the wheel truck rotating transmission 109 may include support arms 181 supporting the rollers 103, 104 therebetween such that the rollers 103, 104 may rotate between the support arms 181 and each support arm 181 may be connected to its center to its own respective rotating bearing 180 such that the support arms 181, and the rollers 103, 104 supported therein, may pivot around the axis of rotation of the two rotating bearings 180. The wheel truck rotating transmission 109 may pivot around their central axes (i.e., their Y axes in FIG. 1A) in both clockwise and counterclockwise directions. The rollers 103, 104 may rotate opposite one another during operation of the layup truck 100. The wheel truck rotating transmission 109 may be supported by stanchions 110. The wheel truck rotating transmission 109 may be configured to hold the rollers 103, 104 in selected positions, such as in one position with the roller 103 extended toward the surface on which the tape 101 is being laid and the roller 104 held back from the surface on which the tape 101 is being laid (e.g., as shown in FIG. 4B) and another position with the roller 104 extended toward the surface on which the tape 101 is being laid and the roller 103 held back from the surface on which the tape 101 is being laid (e.g., as shown in FIG. 4A). The wheel truck transmission 109 may be configured to switch between selected positions by being controlled to pivot around their central axes (i.e., their Y axes in FIG. 1A) in the clockwise and/or counterclockwise directions. The pivoting of the wheel truck rotating transmission 109 may be controlled by a processor (or other type controller) of the ATP head including the layup truck 100 and the control of the pivoting of the wheel truck rotating transmission 109 may thereby control which roller 103, 104 is operating as a compaction drive wheel and which roller 103, 104 is operating as a tensioning guide drive wheel. In some embodiments, mechanical actuators 111 may be coupled to the stanchions 110 of the layup truck 100 and configured to translate the layup truck 100 back and forth along the Z direction. The actuators 111 may be any type of actuators, such magnetically operated actuators (e.g., solenoids, etc.), electrically operated actuators (e.g., piezoelectric stacks, electric motor driven ball screw actuators, etc.), hydraulic pump operated actuators (e.g., pistons, etc.), pressure pump operated actuators (e.g., pistons, diaphragms, etc.), and/or mechanical actuators (e.g., springs, etc.). The actuators 111 may be controlled by a processor (or other type controller) of the ATP head including the layup truck 100. The stanchion 110 controls the relationship of the layup truck 100 to the composite part, with the pressure actuator 111 serving to consolidate the tape 101 to a substrate or support structure (e.g., tool 107) or opposing tape being deposited by another ATP head (e.g., as seen in FIG. 5). The rollers 103, 104 may always rotate opposite to one another, but in the same direction preventing prepreg tape 101 wrinkling/binding and allowing for a consistent even movement and tape 101 tension though parts of the ATP machinery, thereby simplifying continuous operation. The roller 103, 104 operation also decreases the amount of movement required for bidirectional tape 101 layup as the ATP head is not required to both rotate and translate, or translate back down the part and to the side to lay the next adjacent layer, minimizing mechanically induced translation errors and dwell time in comparison to non-dual roller head systems. The ATP head of the various embodiments including the layup truck 100 may shift the width of the tape 101, and the rotation is translated to the tilt oscillation of the layup truck 100 via the wheel truck rotating transmission 109. This tilting may be especially beneficial when the build is complete (e.g., the tape 101 is cut by a tape cutter 102) or the tape 101 runs out and new tape 101 is auto-fed into the system along the same pathway in the same direction as the previously tape 101.

The layup truck 100 may eliminate obtuse head rotation and/or cross-tool translation when laying adjunct tape plies as the rollers 103 and 104 may operate as an adjustable pinch and compaction roller system. FIG. 2 demonstrates the layup truck 100 movement versus the movement direction of the tape 101 in scenarios in which the ATP head including the layup truck 100 may not be translating but the part being built may be translating. Specifically, the actuators 111 may move the layup truck 100 in the M direction and the layup truck 100 may cycle tilt around the Y axis as the ATP head changes lay down direction from a first direction D1 to an opposite second direction D2. The roller 103, 104 in contact with the laid down tape 101 may change as the direction changes. For example, when the ATP head is moving in direction D1, the roller 104 may contact the tape 101 and operation as a compaction drive wheel while the roller 103 operates as a tensioning guide drive wheel. When the ATP head is moving in direction D2, the roller 103 may contact the tape 101 and operation as a compaction drive wheel while the roller 104 operates as a tensioning guide drive wheel. FIG. 3 illustrates how the tape 101 is fed through the layup truck 100. The tape 101 may be held of a prepreg tape reel (or spool) and proceed in between the two rollers 103, 104. FIG. 3 illustrates the view of the tape 101 in a scenario in which the roller 104 may be operating as a compaction drive wheel while the roller 103 is operating as a tensioning guide drive wheel.

FIGS. 4A and 4B illustrate the layup truck 100 along with other components of an ATP head, such as heat applicators 105 and tape cutters 102. The heat applicators 105 may be any type heat applicators, such as lamps, resistive heaters, lasers, etc. When turned on, the heat applicators 105 may apply heat 106 to the tape 101 being deposited. Tape cutters 102 may be any type cutters configured to cut the tape 101, such as mechanical blades, lasers, etc. In various embodiments, a heat applicator 105 and tape cutter 102 may be disposed on both sides of the layup truck 100 to heat and/or cut the tape 101 in the respective direction the tape 101 is being laid down. The heated and consolidated tape 101 exiting the ATP head may form the consolidated composite build form (or part) 108. While only single heaters 105 are shown turned in on various figures, both heaters 105 may be turned on together with one heater operating as a pre-heater and one acting as a head heater at a given time. The directional movement of the ATP head and the tilt cycling of the layup truck 100 is further detailed in FIGS. 4A and 4B. FIGS. 4A and 4B illustrate the operations of a single layup truck 100 in a single ATP head ATP system where the single ATP head is bidirectionally placing tape 101 in opposite directions as the tool 107 (or part) is translated, specifically X direction D1 in FIG. 4A and the opposite X direction D2 in FIG. 4B. The tape 101 is fed between the rollers 103, 104 in the Z direction F1.

Similarly, in FIG. 5, a two ATP head system is shown in which two layup trucks 100 are shown preforming a frameless build without a tool, i.e., without the need for the tool 107. The system illustrated in FIG. 5 can build from one or both sides of the composite 108 once the initial layer is present. In FIG. 5, tape 101 may be fed in the Z direction F1 to a first layup truck 100 and in the Z direction F2 to a second layup truck 100. The rollers 104 operating as compaction drive wheels may exert forces on the tapes 101 therebetween and thereby the tapes 101 may exert opposite forces on one another. FIG. 5 illustrates that the heaters 105 opposite the rollers 104 may apply heat to the tapes 101 to enable the adjoining sides of the tapes 101 to fuse together at contact. By comparing FIG. 5 with FIG. 2, which includes the addition of the pressure actuator 111, the capability of direction reversal required for adjacent tape 101 layup becomes apparent.

Figure 6:
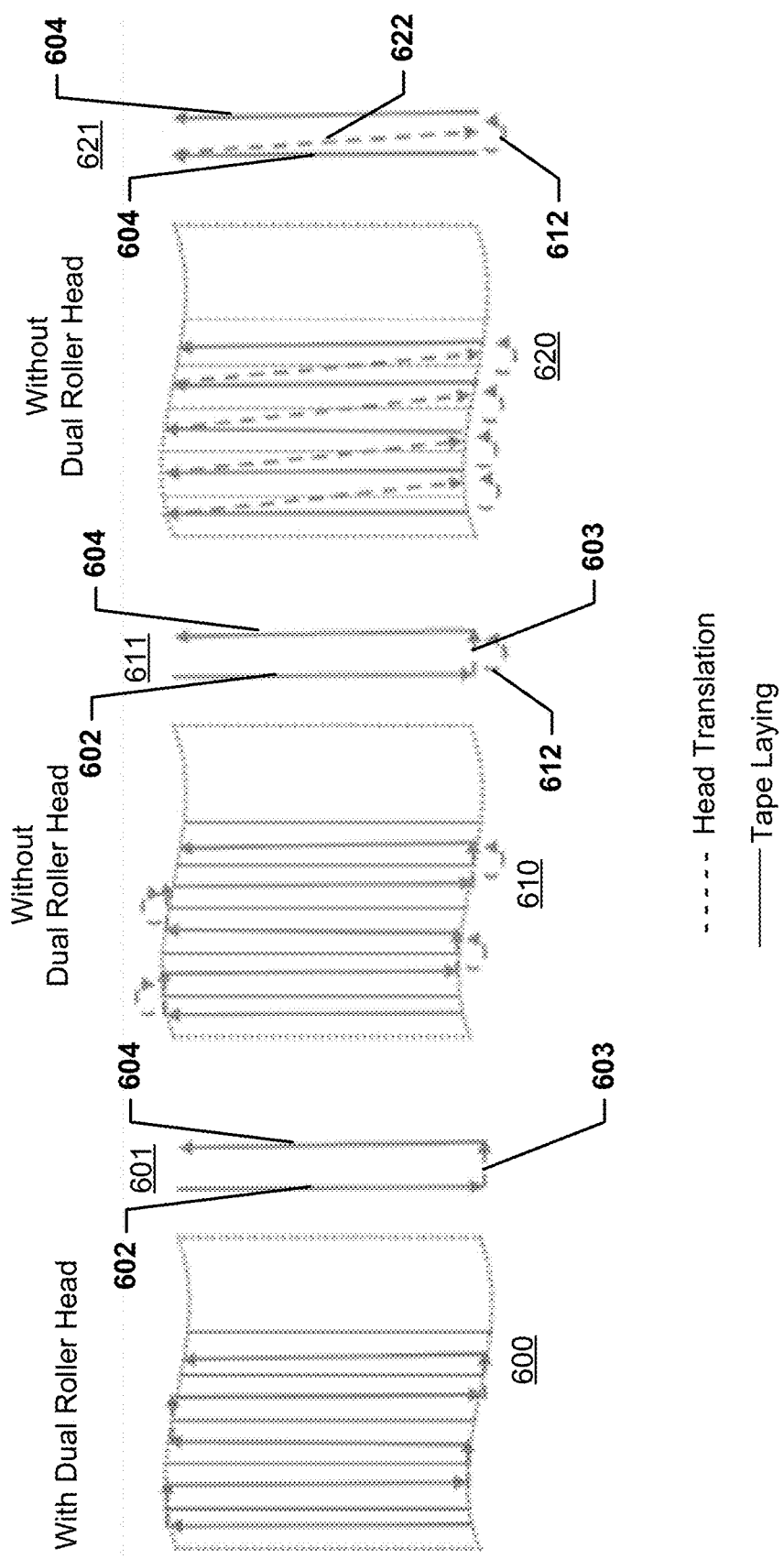
FIG. 6 illustrates a comparison of different ATP head layup movements required to build a unidirectional panel.

FIG. 6 illustrates a comparison of different ATP head layup movements required to build a unidirectional panel. FIG. 6 compares three different head lay down schemes, 600, 610, and 620. Lay down scheme 600 is a lay down scheme enabled by the dual roller head of the various embodiments, such as an ATP head including a layup truck 100. Lay down schemes 610 and 620 are lay down schemes used by ATP systems without dual roller heads. Tape laying is illustrated by solid path arrows in FIG. 6 and head translation is illustrated by broken path arrows in FIG. 6. Portion 601 of scheme 600 shows that a tape lay down in a first direction 602 is followed by a sideways head translation 603, and a tape lay down in a second direction 604 opposite to the first direction 602. No head rotation or diagonal head translation is required in scheme 600 due to the operations of the dual roller head of the various embodiments, such as an ATP head including a layup truck 100. The advantages of decreasing the total steps required for standard applicator heads are shown in the defined layup paths detailed in FIG. 6. In comparison, scheme 610 requires head rotation as illustrated in the portion 611 of the scheme 610 showing that head rotation 612 occurs after the lay down in the first direction 602 while the head translation 603 is occurring. Thus, the scheme 610 requires at least one additional head rotation step 612 for each portion 611 that is not required in the portions 601 of scheme 600. As another comparison, scheme 620 requires off axis translation (i.e., diagonal translation 622) as illustrated in the portion 621 of the scheme 620 showing that diagonal translation 622 occurs after each lay down. A head rotation step 612 is also required. Thus, the scheme 620 requires at least one additional head rotation step 612 and diagonal translation 622 for each portion 621 that is not required in the portions 601 of scheme 600.

Figure 7A:
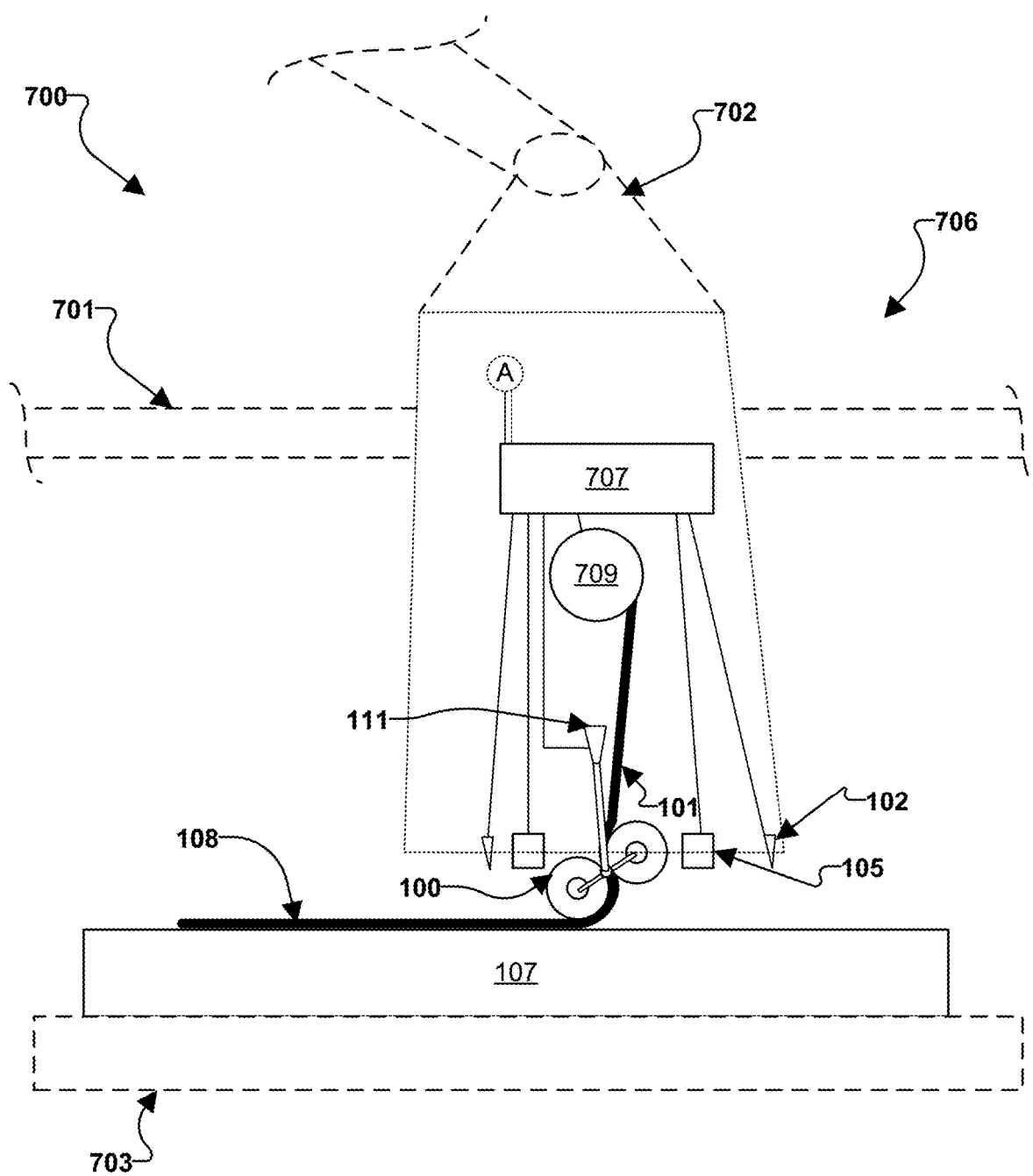
FIG. 7A is a block diagram of an example single ATP head ATP system according to various embodiments.
Figure 7A:
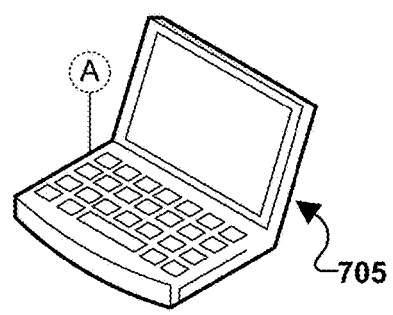

FIG. 7A is a block diagram of an example single ATP head 706 ATP system 700 according to various embodiments including a layup truck 100. The illustration of the ATP system 700 in FIG. 7A is a simplified version of an ATP system, and one of ordinary skill in the art will understand an ATP system suitable for use with various embodiments may include more or less components than shown in FIG. 7A and may operate differently than the ATP system 700 illustrated in FIG. 7A.

In general, the ATP system 700 may include an ATP head 706 that receives at least one tow (or tow tape) 101 that is deposited and compacted onto a tool 107 (e.g., a substrate or other form) to form a laid-down course 108. The tool 107 may operate as a mold for a part to be built up by the repeated depositing of laid-down courses 108 by the ATP head 706. While illustrated and discussed as a single tow 101 system, multiple tows or tapes may be feed and deposited by the ATP head 706 and multiple tapes may be substituted for the single tape 101 in the various embodiments. In some configurations, the ATP head 706 may be stationary and the tool 107 may be supported on an optional moving support 703 (e.g., a translatable platform, rotating spindle, etc.). In some configurations, the ATP head 706 may be mounted on a moving system, such as an optional robotic arm 702 and/or optional gantry system 701, and translate relative to the tool 107 that remains stationary. In some configurations, the ATP head 706 may be mounted on a moving system, such as an optional robotic arm 702 and/or optional gantry system 701, and translate relative to the tool 107 and the tool 107 may be supported on an optional moving support 703 (e.g., a translatable platform, rotating spindle, etc.) such that both the ATP head 706 and the tool 107 may move relative to one another.

In operation, tape 101 may be feed from reel (or spool) 709 (or multiple spools in a multiple tape system). While illustrated as within the ATP head 706, the reel 709 may be located outside the ATP head 706. The tow (or tow tape) 101 may be a fiber tape strip, such as epoxy fiber tape strip, carbon fiber tape strip, carbon fiber epoxy tape strip, etc. The tape 101 may feed through the rollers 103, 104 of the layup truck 100 and be heated and/or cut by the heat applicators 105 and/or tape cutters 102. In various embodiments, the tape 101 from the reel 709 may be auto-fed by the ATP head 706 from the reel 709 through the rollers 103, 104 of the layup truck 100.

As illustrated in FIG. 7A, the ATP system 700 may include a controller 707, such as a processor, microcontroller, etc., configured to control the operations of the layup truck 100, actuators 111, and/or components of the ATP head 706, such as the heat applicators 105, cutters 102, tape reels 709, etc. The ATP head 706 may include sensors (e.g., position sensors, condition sensors, status sensors, etc.) to provide data (e.g., position data, condition data, status data, etc.) of the layup truck 100, actuators 111, and/or components of the ATP head 706, such as the heat applicators 105, cutters 102, tape reels 709, etc., to the controller 707. The controller 707 may be configured to determine positions, conditions, statuses, etc., of the layup truck 100, actuators 111, and/or components of the ATP head 706, such as the heat applicators 105, cutters 102, tape reels 709, etc. The controller 707 may be connected to a computing device 705 of the ATP system 700, such as via one or more wired and/or wireless connections. The computing device 705 may be configured to control the operations of the controller 707, layup truck 100, actuators 111, and/or components of the ATP head 706, such as the heat applicators 105, cutters 102, tape reels 709, etc. As a specific example, the computing device 705 may be configured to control the layup movements of the ATP head 706 and operation of the layup truck 100 and/or actuators 111 in accordance with various embodiments to bidirectionally lay down prepreg tape 101 to build a composite part. As a further specific example, the computing device 705 may be configured to control the layup movements of the ATP head 706 and operation of the layup truck 100 and/or actuators 111 in accordance with various embodiments to bidirectionally lay down prepreg tape 101 to build a composite part according to a lay down scheme, such as lay down scheme 600. The lay down scheme, such as lay down scheme 600, may be configured such that no head rotation of the ATP head 706 and/or diagonal head translation of the ATP head 706 may be required to build a composite part.

Figure 7B:
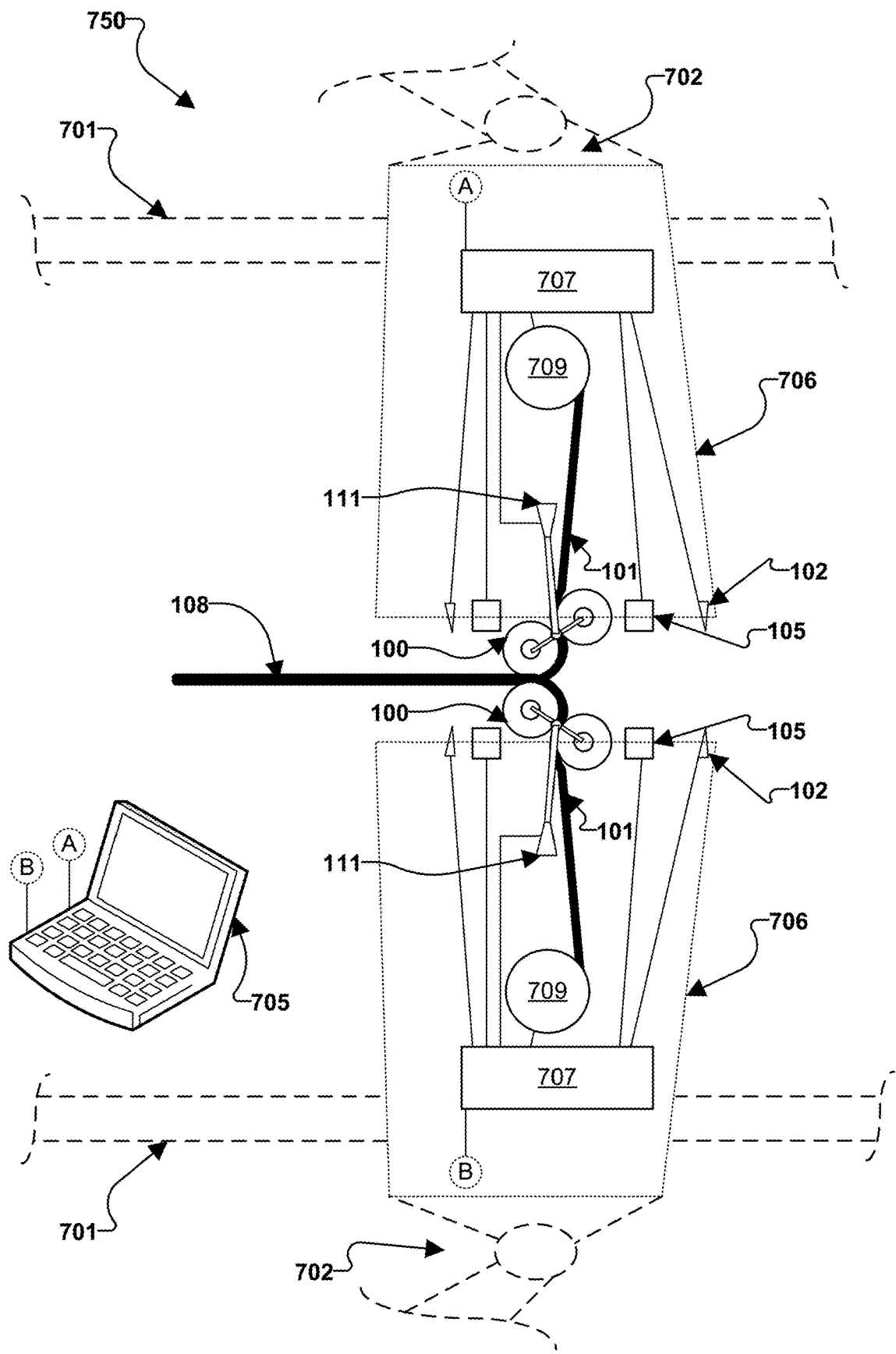
FIG. 7B is a block diagram of an example dual ATP head ATP system according to various embodiments.

FIG. 7B is a block diagram of an example dual ATP head 706 ATP system 750 according to various embodiments. Each ATP head 706 of the ATP system 750 may be similar to the ATP head 706 of the ATP system 700 described above. The dual ATP head 706 ATP system 750 may be similar to system 700 of FIG. 7A, except that the two ATP heads 706 may interact with one another to deposit their respective tapes 101 without the need for a tool 107 or moving support 703. In the ATP system 750, both ATP heads 706 may be controlled by the computing device 705. As a specific example, the computing device 705 may be configured to control the layup movements of both of the ATP heads 706 and operation of their respective layup trucks 100 and/or actuators 111 in accordance with various embodiments to bidirectionally lay down prepreg tape 101 between the two ATP heads 706 to build a composite part. As a further specific example, the computing device 705 may be configured to control the layup movements of the ATP heads 706 and operation of their respective layup trucks 100 and/or actuators 111 in accordance with various embodiments to bidirectionally lay down prepreg tape 101 to build a composite part according to a lay down scheme, such as lay down scheme 600. The two ATP heads 706 may be controlled by the computing device 705 in concert with one another such that the two ATP heads 706 apply opposite force to each other's dispensed tape 101 along the lay down paths of the lay down scheme, such as lay down scheme 600, thereby enabling tool-less (e.g., without the need for the tool 107 or moving support 703) build-up of a part. The lay down scheme, such as lay down scheme 600, may be configured such that no head rotation of the ATP heads 706 and/or diagonal head translation of the ATP heads 706 may be required to build a composite part.

Figure 8A:
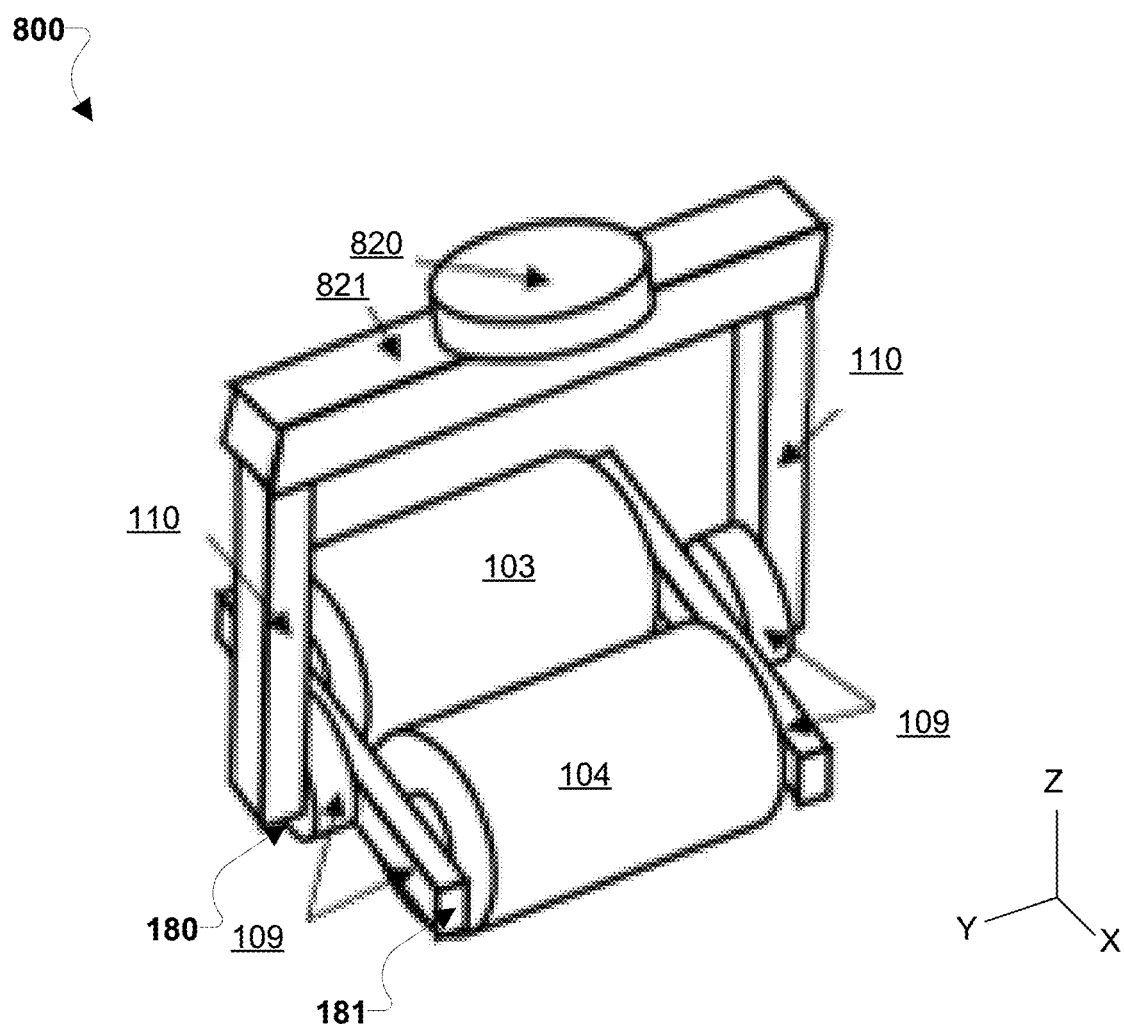
FIG. 8A is a block diagram of an example grip truck including twin rollers in accordance with various embodiments.
Figure 8B:
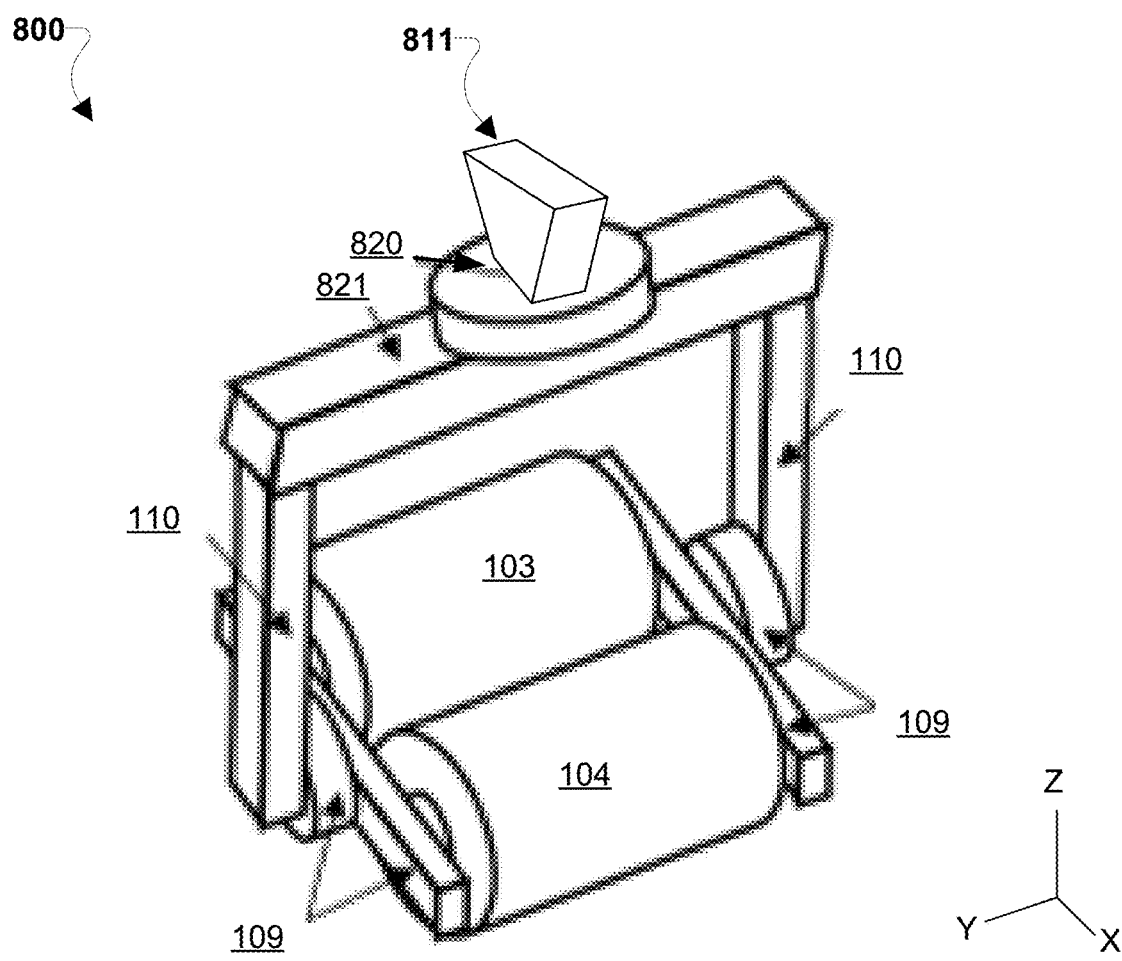
FIG. 8B is a block diagram of the example grip truck of FIG. 8A and an actuator illustrated in accordance with various embodiments.
Figure 9:
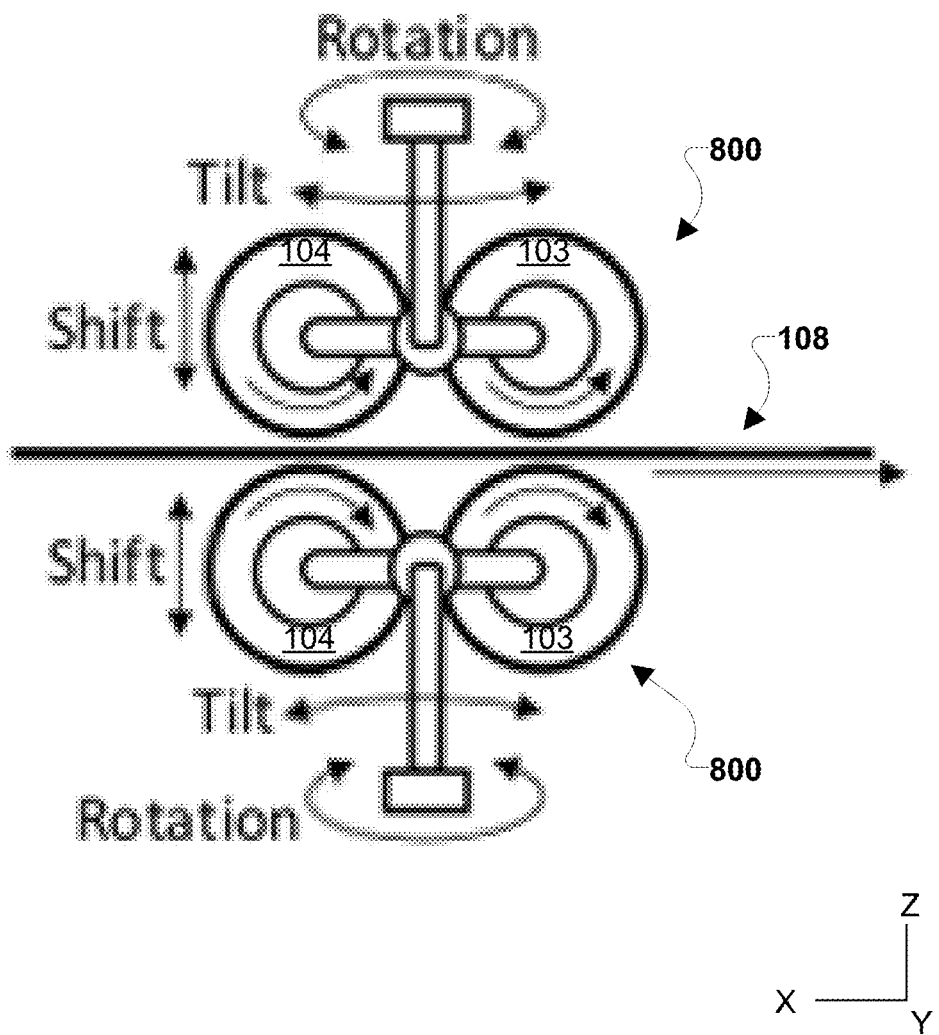
FIG. 9 is a block diagram of two example grip trucks of a dual ATP head ATP system during tape laying in accordance with various embodiments.

Various embodiments may include a handling attachment for composite builds. In various embodiments, the handling attachment for composite builds may be a grip truck including at least one roller, such as one, two, or more rollers, configured to press, hold, and translate the composite build (i.e., the part being built by the ATP system). FIGS. 8A-9 illustrate features of an example grip truck 800 including twin rollers 103, 104 that may simultaneously press, hold, and translate the composite build (i.e., the part being built by the ATP system). FIG. 8A is a block diagram of an example grip truck 800 including twin rollers 103, 104 in accordance with various embodiments. FIG. 8B is a block diagram of the example grip truck 800 and an actuator 811 illustrated in accordance with various embodiments. FIG. 9 is a block diagram of two example grip trucks 800 of a dual ATP head ATP system during tape 101 laying in accordance with various embodiments.

With reference to FIGS. 1A-9, the grip truck 800 may be similar to the layup truck 100, except no tape 101 is fed through the grip truck 800. The grip truck 800 may be used to grip the composite surface. In the grip truck 800 configuration, the rollers 103, 104 may operate as drive wheels whose purpose is to simultaneously press, hold, and translate the composite build. In the grip truck 800 configuration, the stanchions 110 may be attached to a common rotatable collar 821 on a rotating link 820 forming a yoke and universal joint which may be mechanically controlled, such as by an actuator 811 as illustrated in FIG. 8B. The actuators 811 may be any type of actuators, such magnetically operated actuators (e.g., solenoids, etc.), electrically operated actuators (e.g., piezoelectric stacks, electric motor driven ball screw actuators, etc.), hydraulic pump operated actuators (e.g., pistons, etc.), pressure pump operated actuators (e.g., pistons, diaphragms, etc.), and/or mechanical actuators (e.g., springs, etc.). The actuators 811 may be controlled by a processor (or other type controller) of the ATP head including the grip truck 800. The actuators 811 may rotate the grip truck 800 about the Z axis in clockwise or counterclockwise directions. The actuators 811 may shift the grip truck 800 back and forth along the Z axis. The actuators 811 may tilt the grip truck 800 relative to the Y axis in clockwise or counterclockwise directions. Rotation of the grip truck 800 about the Z axis may change the axis around which the grip truck 800 tilts.

In operation, the grip truck 800 may press against a similar opposing grip truck 800 as illustrated in FIG. 9, and the grip truck 800 grips the prepreg that has been deposited 108. Since the grip trucks 800 may independently rotate, tilt, and shift, the grip trucks 800 can hold the composite build as it curves, requires rotation, and/or changes thickness. While FIGS. 8A, 8B, and 9 illustrate the grip truck 800 including twin rollers 103, 104, in alternative embodiments the grip truck 800 may include less rollers, such as only a single roller 103 or 104, or may include more rollers such as additional rollers (e.g., such that the grip truck 800 include three, four, five, or more rollers similar to rollers 103 or 104).

FIG. 10 is a block diagram of components of an example dual ATP head ATP system 1000 illustrating tape 101 placement in accordance with various embodiments. With reference to FIGS. 1A-10, the dual ATP head ATP system 1000 may be similar to the ATP system 750 of FIG. 7B, except that the ATP heads may additionally include grip trucks 800. FIG. 10 demonstrates the setup during the tape 101 laying in which the grip trucks 800 push opposite one another in addition to the opposite interacting layup trucks 100. The grip trucks 800 may be positioned on either side of the ATP heads. The actuators 811 of the grip trucks 800 may be connected to the controllers 707. The controllers 707 and/or the computing device 705 may control the operations of the grip trucks 800 to independently rotate, tilt, and/or shift the grip trucks 800 to hold the composite build.

Figure 11:
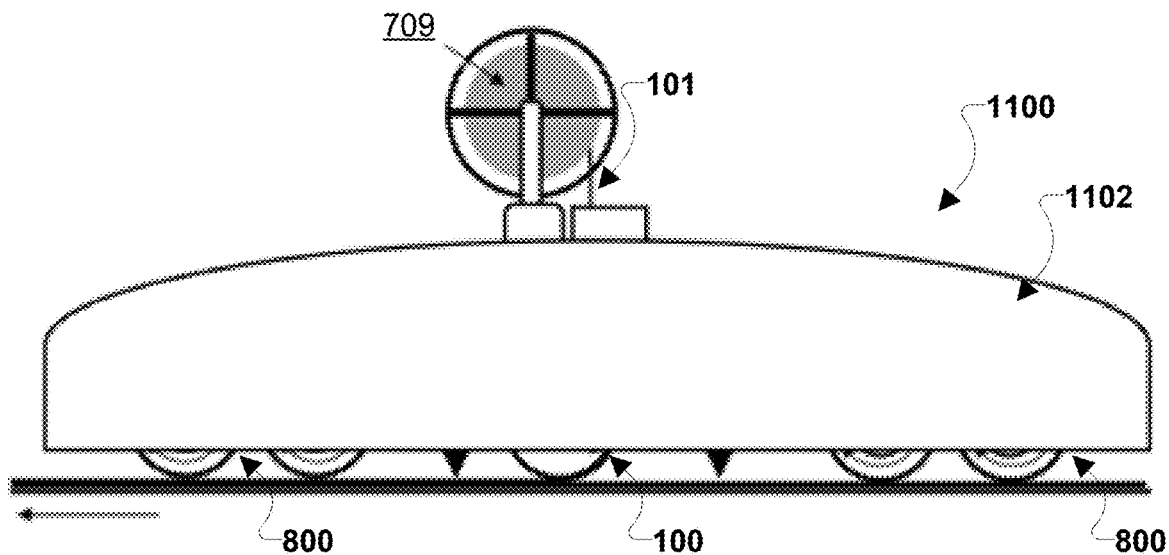
FIG. 11 is a block diagram of an example ATP head in accordance with various embodiments.

In some embodiments, the truck system (e.g., a grouping of a layup truck 100 and two grip trucks 800 discussed with reference to FIG. 10 as part of one of the ATP heads of the dual ATP head ATP system 1000) may be coupled together and encased with additional hardware, to create and advanced applicator head system, or car as illustrated in FIG. 11. With reference to FIGS. 1A-11, the car 1100 is a standalone ATP head that can connect to a robot arm or gantry (e.g., 702, 701) to build a complex composite with, or without, the use of a tool or frame. For example, the car 1100 may be a specific example of an ATP head 706 that may be used with the ATP systems 700 and/or 750. The car 1100 may include a housing 1102 encasing two grip trucks 800 and a layup truck 100. While two grip trucks 800 and a layup truck 100 are discussed as encased by the housing 1102 of the car 1100, this is merely an example of the number of grip trucks 800 and/or layup trucks 100. Other configurations in accordance with the various embodiments may include more than two grip trucks 800, such as three, four, five, six, more than six, etc., and/or more than one layup truck 100, such as two, three, four, more than four, etc. The housing 1101 of the car 1100 may also encase other components of an ATP head, such as the heat applicators 105, cutters 102, etc. While FIG. 11 illustrates the tape reel 709 as disposed outside the housing 1101 of the car 1100, in an alternative configuration, the tape reel 709 may also be encased by the housing 1101.

In scenarios in which the car 1100 may be equipped with a positioning system or capability (e.g., position sensors providing position data to a controller, such as controller 707), the car 1100 may operate independently as a self-contained system. For example, the car 1100 may be the ATP head of an ATP system that does not require a robot arm or gantry. Partial pressure may be applied to the prepreg by applying the weight of the car 1100 to each truck 100 and 800 and using the independent truck control systems (e.g., the actuators 111 and/or 811 controlled by the controller 707 and/or computing device 705) to affect the locally applied loads. For example, the car 1100 may be controlled by the controller 707 and/or computing device 705. Specific examples of changing the applied pressure or load on the composite being made using the car (or cars) 1100 when the car (or cars) 1100 are used in an ATP system without a robot arm or gantry may include to add static weight (e.g., solid ingots, solid plates, etc.) and/or dynamic weight (e.g., fluid to a bladder, etc.) to one of the cars 1100 (e.g., typically the upper car 1100) or by using electromagnets dynamically controlled to attract or repulse the other car 1100, accordingly. The computing device 705 may be configured to control the operations of the controller 707, layup truck 100, grip trucks 800, actuators 111 and/or 811, and/or components of the car 1100, such as the heat applicators 105, cutters 102, tape reels 709, etc. As a specific example, the computing device 705 may be configured to control the layup movements of the car 1100 and operation of the layup truck 100, grip trucks 800, and/or actuators 111 and/or 811 in accordance with various embodiments to bidirectionally lay down prepreg tape 101 to build a composite part. As a further specific example, the computing device 705 may be configured to control the layup movements of the car 1100 and operation of the layup truck 100, grip trucks 800, and/or actuators 111 and/or 811 in accordance with various embodiments to bidirectionally lay down prepreg tape 101 to build a composite part according to a lay down scheme, such as lay down scheme 600. The lay down scheme, such as lay down scheme 600, may be configured such that no head rotation of the car 1100 and/or diagonal head translation of the car 1100 may be required to build a composite part.

In scenarios in which two cars are used opposite of each other, and each knows the position of the other's rollers 103, 104 (e.g., via position tracking of the rollers 103, 104 and/or the actuators 111 and/or 811 by the controller 707 and/or computing device 705), a composite panel may be built with the bottom car 1100 (upside down and stationary) and the topside car 1100 (right side up and stationary) by using the weight on the rollers 103, 104 to shift the composite needed to build the part. This ability to shift the composite may be especially beneficial when closed shell tubular structure is needed, where a gantry or arm support system prevents such a build without an internal mold or bladder. As a specific example, the computing device 705 may be configured to control the layup trucks 100, grip trucks 800, and/or actuators 111 and/or 811 of the cars 1100 and in accordance with various embodiments to bidirectionally lay down prepreg tape 101 to build a composite part without the cars 1100 moving (i.e., the car 1100 remain stationary and the control of the layup trucks 100, grip trucks 800, and/or actuators 111 and/or 811 of the cars 1100 moves the part being built-up). As a further specific example, the computing device 705 may be configured to control the layup trucks 100, grip trucks 800, and/or actuators 111 and/or 811 of the cars 1100 in accordance with various embodiments to bidirectionally lay down prepreg tape 101 to build a composite part according to a lay down scheme in which the cars 1100 remain stationary and the activations of the layup trucks 100, grip trucks 800, and/or actuators 111 and/or 811 of the cars 1100 cause the part being built-up to move. The lay down scheme may be configured such that no position change of the cars 1100 may be required to build a composite part (i.e., such that the top car 1100 and the bottom car 1100 remain stationary and the composite part moves).

Figure 12:
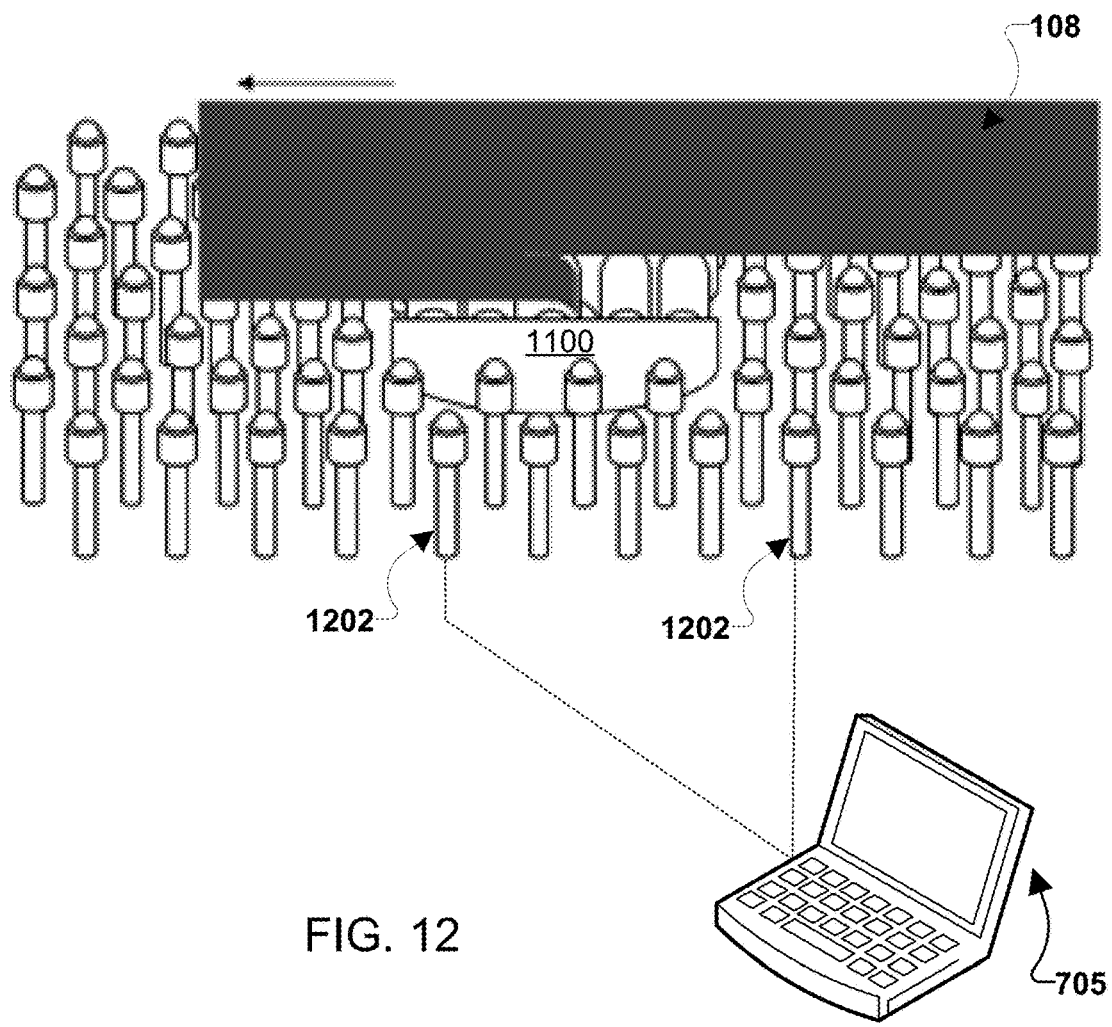
FIG. 12 is a block diagram of a portion of an example ATP system during tape lay down in accordance with various embodiments.

In some embodiments, in scenarios in which the composite structure lacks initial stiffness, a system of actuated ball posts 1202 may be used to assist in helping the composite maintain its shape during the manufacturing process. With reference to FIGS. 1-12, FIG. 12 is a block diagram of a portion of an example ATP system during tape 101 lay down in accordance with various embodiments in which actuated ball posts 1202 support the part being formed. Two cars 1100 may lay down tape 101 and move the composite part being fabricated over the posts 1202. The cars 1100 may remain stationary and the part may translate relative to the cars 1100 over the posts 1202. The height of the posts 1202 may be monitored and controlled by a computing device connected to the posts 1202, such as computing device 705. FIG. 12 shows an upside-down car 1100 with the required top car not shown for ease of illustration in an effort to demonstrate how the adjustable ball posts 1202 support a flexible composite being fabricated. The capped balls of the posts 1202 allow the panel of laid down tape 108 to slide in any direction determined by the car's 1100 trucks. Additionally, the adjustable height of the posts 1202 may accommodate curved shells.

Figure 13:
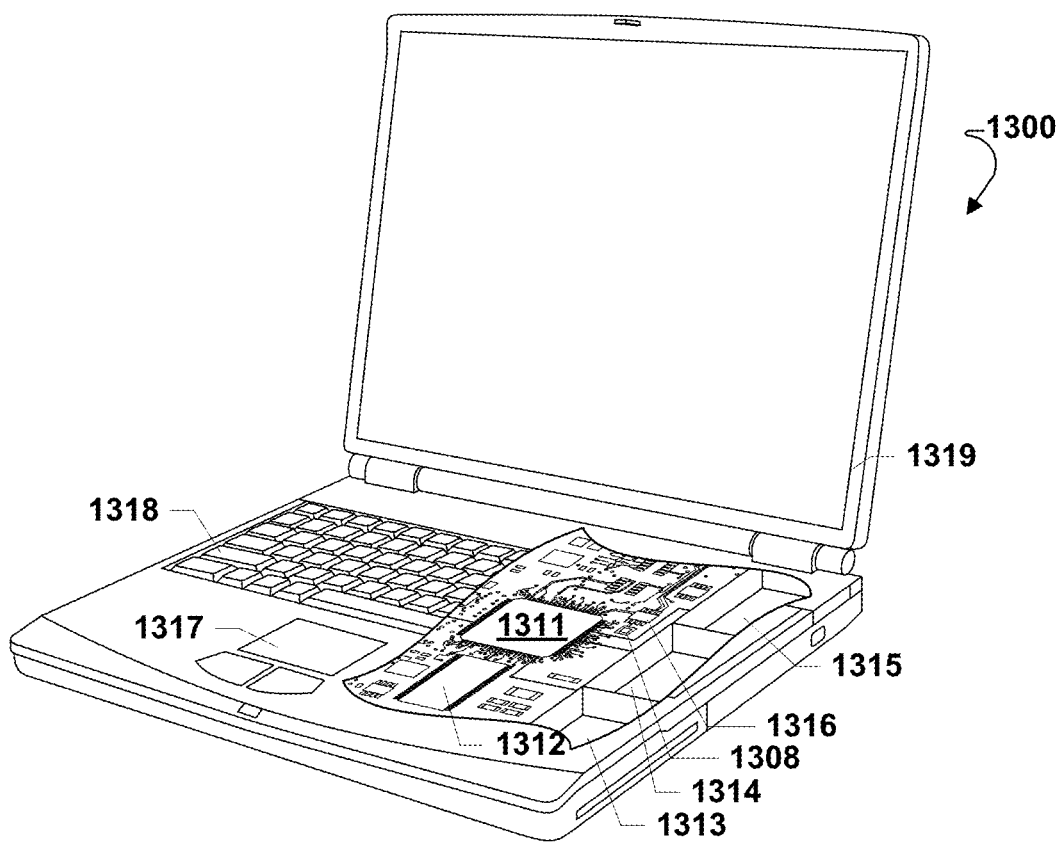
FIG. 13 is a component block diagram of a laptop that is a computing device suitable for use in the various embodiments.

The various embodiments described above may also be implemented within a variety of computing devices, such as a laptop computer 1300 illustrated in FIG. 13. For example, the laptop computer 1300 may be an example of computing device 705. Many laptop computers include a touchpad 1317 with touch surface that serves as the computer's pointing device, and thus may receive drag, scroll, and flick gestures similar to those implemented on mobile computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the laptop computer 1300 may have one or more antennas 1308 for sending and receiving electromagnetic radiation that may be connected to a wireless data link and/or cellular telephone transceiver 1316 coupled to the processor 1311. The laptop computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the mobile computing device may include a computer mouse or trackball coupled to the processor (e.g., via a USB input) as are well known, which may also be used in conjunction with the various embodiments.

The processors described herein may be any programmable microprocessor, microcomputer or multiple processor chip or chips that can be configured by software instructions (applications) to perform a variety of functions, including the functions of the various embodiments described above. In some embodiments, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein

What is claimed is:

1. An Automated Tape Placement (ATP) head, comprising:
    a layup truck, comprising:
        two rollers;
        a rotating transmission supporting the two rollers;
            wherein the rotating transmission is configured to tilt such that in a first position of the rotating transmission a first of the two rollers operates as a compaction drive wheel and the second of the two rollers operates as a tensioning guide drive wheel for a tape being deposited by the ATP head and in a second position of the rotating transmission the second of the two rollers operates as the compaction drive wheel and the first of the two rollers operates as the tensioning guide drive wheel for the tape being deposited by the ATP head;
            wherein the tape being deposited by the ATP head passes between the two rollers contacting both of the two rollers in both of the first position of the rotating transmission and the second position of the rotating transmission;
        wherein the layup truck further comprises stanchions supporting the rotating transmission;
    at least one grip truck, comprising:
        two rollers;
        a rotating transmission supporting the two rollers;
        stanchions supporting the rotating transmission; and
        a rotatable collar attached to the stanchions and including a rotating link, wherein the tape being deposited by the ATP head does not pass between the two rollers of the at least one grip truck.

2. The ATP head of claim 1, wherein the at least one grip truck is two grip trucks and the two grip trucks are disposed on opposite sides of the layup truck.

3. The ATP head of claim 2, further comprising one or more heat applicators and one or more tape cutters.

4. The ATP head of claim 3, further comprising a housing encasing the layup truck, the two grip trucks, the one or more heat applicators, and the one or more tape cutters.

5. The ATP head of claim 1, further comprising:
    at least one actuator coupled to the layup truck, wherein the at least one actuator is configured to move the layup truck toward the tape being deposited by the ATP head such that the first or the second roller operating as the compaction drive wheel compacts the tape onto a working surface.

6. An ATP system, comprising:
    a first ATP head, comprising:
        a layup truck, comprising:
            two rollers;
            a rotating transmission supporting the two rollers;
                wherein the rotating transmission is configured to tilt such that in a first position of the rotating transmission a first of the two rollers operates as a compaction drive wheel and the second of the two rollers operates as a tensioning guide drive wheel for a tape being deposited by the ATP head and in a second position of the rotating transmission the second of the two rollers operates as the compaction drive wheel and the first of the two rollers operates as the tensioning guide drive wheel for the tape being deposited by the ATP head;
                wherein the tape being deposited by the ATP head passes between the two rollers contacting both of the two rollers in both of the first position of the rotating transmission and the second position of the rotating transmission;
        a first pair of grip trucks, each grip truck of the first pair of grip trucks comprising:
            two rollers;
            a rotating transmission supporting the two rollers;
            stanchions supporting the rotating transmission; and
            a rotatable collar attached to the stanchions and including a rotating link, wherein the first tape being deposited by the first ATP head does not pass between the two rollers of either of the first pair of grip trucks.

7. The ATP system of claim 6, wherein the first ATP head further comprises one or more heat applicators and one or more tape cutters.

8. The ATP system of claim 6, further comprising a computing device configured to control the first ATP head to build a composite part according to a lay down scheme including multiple tape lay down directions, wherein the lay down scheme requires no head rotation of the first ATP head and requires no diagonal head translation of the first ATP head.

9. The ATP system of claim 6, further comprising:
a second ATP head, comprising:
  a second layup truck, comprising:
    two rollers; and
    a rotating transmission supporting the two rollers, wherein the rotating transmission is configured to tilt such that in a first position of the rotating transmission a first of the two rollers operates as a compaction drive wheel and the second of the two rollers operates as a tensioning guide drive wheel for a second tape being deposited by the second ATP head and in a second position of the rotating transmission the second of the two rollers operates as the compaction drive wheel and the first of the two rollers operates as the tensioning guide drive wheel for the second tape being deposited by the second ATP head; and
  a second pair of grip trucks, each grip truck of the second pair of grip trucks comprising:
    two rollers;
    a rotating transmission supporting the two rollers;
    stanchions supporting the rotating transmission; and
    a rotatable collar attached to the stanchions and including a rotating link, wherein the second tape being deposited by the second ATP head does not pass between the two rollers of either of the second pair of grip trucks.

10. The ATP system of claim 9, further comprising:
a first robotic arm or first gantry system connected to the first ATP head; and
a second robotic arm or second gantry system connected to the second ATP head, wherein the respective robotic arms or gantry systems independently move the first ATP head and the second ATP head.

11. The ATP system of claim 9, wherein the first ATP head and the second ATP head are configured such that the first tape is deposited onto the second tape to build a composite part.

12. The ATP system of claim 11, wherein the first ATP head and the second ATP head are held opposite one another and stationary to one another during building of the composite part.

13. The ATP system of claim 12, further comprising a system of actuated ball posts configured to support the composite part during building.

14. The ATP system of claim 13, wherein each of the first ATP head and the second ATP head including a respective housing.

* * * * *